(12) United States Patent
Moncla et al.

(10) Patent No.: US 8,232,336 B2
(45) Date of Patent: Jul. 31, 2012

(54) AQUEOUS DISPERSION, ITS PRODUCTION METHOD, AND ITS USE

(75) Inventors: Brad M. Moncla, Lake Jackson, TX (US); Matthew J. Kalinowski, Freeland, MI (US); David R. Speth, Upper Arlington, OH (US); Charles F. Diehl, Blue Bell, PA (US); Dale C. Schmidt, Midland, MI (US); Kevin D. Maak, Midland, MI (US); Ronald Wevers, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/252,619

(22) Filed: Oct. 4, 2011

(65) Prior Publication Data

US 2012/0029132 A1  Feb. 2, 2012

Related U.S. Application Data

(63) Continuation of application No. 12/559,056, filed on Sep. 14, 2009, now Pat. No. 8,063,128, which is a continuation of application No. 10/925,693, filed on Aug. 25, 2004, now Pat. No. 7,803,865.

(60) Provisional application No. 60/548,493, filed on Feb. 27, 2004, provisional application No. 60/497,527, filed on Aug. 25, 2003.

(51) Int. Cl.
| | |
|---|---|
| C08K 5/00 | (2006.01) |
| B05D 7/00 | (2006.01) |
| C04B 24/26 | (2006.01) |
| C08J 3/00 | (2006.01) |
| B29C 47/00 | (2006.01) |

(52) U.S. Cl. ........ 524/284; 524/563; 524/579; 524/582; 524/522

(58) Field of Classification Search ............ 524/284, 524/563, 579, 582, 522
See application file for complete search history.

(56) References Cited

U.S. PATENT DOCUMENTS

| | | | | |
|---|---|---|---|---|
| 5,116,534 A | * | 5/1992 | Mollet et al. | 516/29 |
| 7,947,776 B2 | * | 5/2011 | Moncla et al. | 524/523 |
| 8,063,128 B2 | * | 11/2011 | Moncla et al. | 524/284 |

* cited by examiner

Primary Examiner — William Cheung

(57) ABSTRACT

Aqueous dispersions including at least one thermoplastic resin; at least one dispersing agent; and water; wherein the dispersion has a pH of less than 12 are disclosed along with dispersions including at least one thermoplastic resin; at least one dispersing agent; and water wherein the dispersion has a volume average particle size of less than about 5 μm. Some dispersions include less than about 4 percent by weight of the dispersing agent based on the weight of the thermoplastic resin. Other dispersions include at least one propylene-rich alpha-olefin interpolymer; at least one dispersing agent; and water. Methods of making such dispersions are also described.

4 Claims, 1 Drawing Sheet

AQUEOUS DISPERSION, ITS PRODUCTION METHOD, AND ITS USE

CROSS-REFERENCE TO RELATED APPLICATIONS

This patent application is a continuation application of the U.S. patent application Ser. No. 12/559,056, filed on Sep. 14, 2009, entitled "AQUEOUS DISPERSION, ITS PRODUCTION METHOD, AND ITS USE," which is a continuation application of the U.S. patent application Ser. No. 10/925,693, filed on Aug. 25, 2004, entitled "AQUEOUS DISPERSION, ITS PRODUCTION METHOD, AND ITS USE," the teachings of which are incorporated by reference herein, as if reproduced in full hereinbelow, which claims priority to U.S. patent to the U.S. Provisional Application Ser. No. 60/497,527, filed on Aug. 25, 2003, entitled "FROTHS AND DURABLE FOAMS OF DISPERSED OLEFIN POLYMERS AND ARTICLES PREPARED FROM SAME," and the U.S. Provisional Application Ser. No. 60/548,493, filed on Feb. 27, 2004, entitled "FROTH AND DURABLE FOAM OF DISPERSED OLEFIN POLYMERS, METHODS OF MAKING FOAM AND ARTICLES PREPARED FROM SAME," the teachings of which are incorporated by reference herein, as if reproduced in full hereinbelow.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

Aqueous dispersions of a thermoplastic resin of various types are known in the art. Aqueous dispersions have been used in a wide variety of fields since an aqueous dispersion prepared by using water as its dispersion medium is far more advantageous than the dispersions prepared by using an organic solvent for the dispersion medium in view of flammability, working environment, handling convenience, and the like. For example, when an aqueous dispersion is coated and dried on a surface of a substrate such as paper, fiber, wood, metal, or plastic molded article, the resin coating formed will provide the substrate with water resistance, oil resistance, chemical resistance, corrosion resistance and heat sealability.

Conventional aqueous dispersions of a thermoplastic resin have been produced either by a process wherein a polymerizable monomer which is the resin raw material is polymerized by emulsion polymerization in an aqueous medium in the presence of a dispersing agent, or by a process wherein a molten thermoplastic resin and an aqueous medium, and optionally, a dispersing agent are mixed by applying shearing force. The former process is associated with the disadvantage of the limited number of the polymerizable monomers that can be used, and hence, the variety of the aqueous dispersions of the thermoplastic resin that can be produced, is limited. The former process also suffers from complicated control of the polymerization reaction as well as intricate equipment. On the other hand, the latter process is applicable to a wide variety of resins in relatively simple equipment.

BRIEF SUMMARY OF THE INVENTION

In one aspect the invention provides an aqueous dispersion comprising (A) at least one thermoplastic resin; (B) at least one dispersing agent; and (C) water; wherein the dispersion has a pH of less than 12. In another aspect the invention provides an aqueous dispersion comprising (A) at least one thermoplastic resin; (B) at least one dispersing agent; and (C) water wherein the dispersion has a volume average particle size of less than about 5 μm. In some dispersions according to either aspect, the dispersing agent comprises less than about 4 percent by weight based on the weight of the thermoplastic resin. In some dispersions having a pH of 12 or less, the dispersion also has a volume average particle size of less than about 5 μm. Some dispersions that have a particle size of less than about 5 μm also have a pH of less than 12. In still other embodiments, the dispersion has a pH of less than 12, and an average particle size of less than about 5 μm, and wherein the dispersing agent comprises less than about 4 percent by weight based on the weight of the thermoplastic resin.

In some dispersions the thermoplastic resin is an alpha-olefin interpolymer of ethylene with at least one comonomer selected from the group consisting of a $C_4$-$C_{20}$ linear, branched or cyclic diene, or an ethylene vinyl compound, such as vinyl acetate, and a compound represented by the formula $H_2C=CHR$ wherein R is a $C_1$-$C_{20}$ linear, branched or cyclic alkyl group or a $C_6$-$C_{20}$ aryl group. Preferred comonomers include propylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the interpolymer of ethylene has a density of less than about 0.92 g/cc.

In other embodiments, the thermoplastic resin comprises an alpha-olefin interpolymer of propylene with at least one comonomer selected from the group consisting of ethylene, a $C_4$-$C_{20}$ linear, branched or cyclic diene, and a compound represented by the formula $H_2C=CHR$ wherein R is a $C_1$-$C_{20}$ linear, branched or cyclic alkyl group or a $C_6$-$C_{20}$ aryl group. Preferred comonomers include ethylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the comonomer is present at about 5% weight percent to about 25% weight percent of the interpolymer. In some embodiments, a propylene-ethylene interpolymer is preferred.

Some interpolymers of propylene that are useful in particular embodiments are propylene-rich alpha-olefin interpolymer comprising 5 to 25% by weight of ethylene-derived units and 95 to 75% by weight of propylene-derived units. In some embodiments, propylene rich alpha-olefin interpolymers having (a) a melting point of less than 90° C.; a relationship of elasticity to 500% tensile modulus such that the elasticity is less than or equal to 0.935M+12, where elasticity is in percent and M is the 500% tensile modulus in MPa; and a relationship of flexural modulus to 500% tensile modulus such that flexural modulus is less than or equal to $4.2e^{0.27M}+50$, where flexural modulus is in MPa and M is the 500% tensile modulus in MPa are preferred. In some embodiments, the propylene rich alpha-olefin interpolymer comprises 6 to 20% by weight of ethylene-derived units and 94 to 80% by weight of propylene-derived units. In other embodiments, polymers comprising 8 to 20% by weight of ethylene-derived units and 92 to 80% by weight of propylene-derived units are preferred. In still other embodiments, polymers comprising 10 to 20% by weight of ethylene-derived units and 90 to 80% by weight of propylene-derived units.

In other embodiments, a propylene-rich alpha-olefin interpolymer that comprises a copolymer of propylene and at least one comonomer selected from the group consisting of ethylene and $C_4$ to $C_{20}$ alpha-olefins, wherein the copolymer has a propylene content of greater than 65 mole percent, a weight average molecular weight (Mw) of from about 15,000 to about 200,000, a weight average molecular weight/number average molecular weight ratio (Mw/Mn) of from about 1.5 to about 4 is preferred.

Some propylene-rich alpha-olefin interpolymers have a heat of fusion of less than about 80 J/g, preferably from about 8 to about 80, or more preferably from about 30 to about 80 J/g as determined by DSC.

In some embodiments, the at least one thermoplastic resin has a crystallinity of less than about 50%. In other embodiments, the crystallinity ranges from about 5% to about 45%, or from about 5% to about 40%.

Any suitable dispersing agent can be used. However, in particular embodiments, the dispersing agent comprises at least one carboxylic acid, a salt of at least one carboxylic acid, or carboxylic acid ester or salt of the carboxylic acid ester. One example of a carboxylic acid useful as a dispersant is a fatty acid such as montanic acid. In some preferred embodiments, the carboxylic acid, the salt of the carboxylic acid, or at least one carboxylic acid fragment of the carboxylic acid ester or at least one carboxylic acid fragment of the salt of the carboxylic acid ester has fewer than 25 carbon atoms. In other embodiments, the carboxylic acid, the salt of the carboxylic acid, or at least one carboxylic acid fragment of the carboxylic acid ester or at least one carboxylic acid fragment of the salt of the carboxylic acid ester has 12 to 25 carbon atoms. In some embodiments, carboxylic acids, salts of the carboxylic acid, at least one carboxylic acid fragment of the carboxylic acid ester or its salt has 15 to 25 carbon atoms are preferred. In other embodiments, the number of carbon atoms is 25 to 60. Some preferred salts comprise a cation selected from the group consisting of an alkali metal cation, alkaline earth metal cation, or ammonium or alkyl ammonium cation.

In still other embodiments, the dispersing agent is selected from the group consisting of ethylene carboxylic acid polymers, and their salts, such as ethylene acrylic acid copolymers or ethylene methacrylic acid copolymers.

In other embodiments, the dispersing agent is selected from alkyl ether carboxylates, petroleum sulfonates sulfonated polyoxyethylenated alcohol, sulfated or phosphated polyoxyethylenated alcohols, polymeric ethylene oxide/propylene oxide/ethylene oxide dispersing agents, primary and secondary alcohol ethoxylates, alkyl glycosides and alkyl glycerides.

Combinations any of the above-enumerated dispersing agents can also be used to prepared some aqueous dispersions.

Some dispersions described herein have an advantageous particle size distribution. In particular embodiments, the dispersion has a particle size distribution defined as volume average particle diameter (Dv) divided by number average particle diameter (Dn) of less than or equal to about 2.0. In other embodiments, the dispersion has a particle size distribution of less than or equal to about less than 1.5.

Some dispersions described herein comprise particles having an average particle size of less than about 1.5 μm. In other embodiments, the average particle size ranges from about 0.05 μm to about 1.5 μm. In still other embodiments, the average particle size of the dispersion ranges from about 0.5 μm to about 1.5 μm.

For dispersions having a pH of less than 12, some dispersions have a pH of from about 5 to about 11.5, preferably from about 7 to about 11, more preferably from about 9 to about 11. The pH can be controlled by a number of factors, including type or strength of base (dispersing agent), degree of conversion of the base to the salt form, type of thermoplastic polymer to be dispersed, and melt kneading (e.g., extruder) processing conditions. The pH can be adjusted either in-situ, or by converting the carboxylic acid dispersing agent to the salt form before adding it to the thermoplastic resin and forming the dispersion. Of these, forming the salt in-situ is preferred.

Preferably, the dispersions are characterized by a percent solids content of less than about 74% by volume. Some dispersions have a percent solids of from about 5% to about 74% by volume. Still other dispersions have a percent solids of less than about 70% by volume, less than about 65% by volume, or from about 5% to about 50% by volume.

In another aspect embodiments of the invention provide a method for producing an aqueous dispersion comprising: (1) melt kneading (A) at least one thermoplastic resin and (B) at least one dispersing agent, to produce a melt-kneaded product and (2) diluting said melt-kneaded product, and melt kneading the resulting mixture to form the aqueous dispersion, wherein the dispersion has an average particle size of less than about 5 μm. Other embodiments provide a method for producing an aqueous dispersion comprising: (1) melt kneading (A) at least one thermoplastic resin and (B) at least one dispersing agent, to produce a melt-kneaded product and (2) diluting said melt-kneaded product, and melt kneading the resulting mixture to form the aqueous dispersion to produce a dispersion having a pH of less than 12. In some methods according to either aspect, the dispersing agent comprises less than about 4 percent by weight based on the weight of the thermoplastic resin. In some methods that provide a dispersion having a pH of 12 or less, the dispersion also has a volume average particle size of less than about 5 μm. Some dispersions that have a particle size of less than about 5 μm also have a pH of less than 12. Embodiments of the methods use the thermoplastic resins and dispersing agents described above. And in some embodiments, the methods provide dispersions having one or more of the properties described above.

In another aspect, embodiments of the invention provide an aqueous dispersion comprising (A) at least one propylene-rich alpha-olefin interpolymer; (B) at least one dispersing agent; and (C) water. On preferred alpha-olefin is ethylene, preferably present in an amount of from about 5% to about 25% by weight. In some embodiments of the invention according to this aspect the propylene-rich alpha-olefin interpolymer is characterized as having an isotactic triad (mm) measured by $^{13}$C NMR of greater than about 0.85. Some such propylene-rich alpha-olefin interpolymer comprise 5 to 25% by weight of ethylene-derived units and 95 to 75% by weight of propylene-derived units. Additionally, some propylene-rich alpha-olefin interpolymers have (a) a melting point of less than 90° C.; (b) a relationship of elasticity to 500% tensile modulus such that the elasticity is less than or equal to 0.935M+12, where elasticity is in percent and M is the 500% tensile modulus in MPa; and (c) a relationship of flexural modulus to 500% tensile modulus such that flexural modulus is less than or equal to $4.2e^{0.27M}+50$, where flexural modulus is in MPa and M is the 500% tensile modulus in MPa. In some embodiments, the propylene rich alpha-olefin interpolymer comprises 6 to 20% by weight of ethylene-derived units and 94 to 80% by weight of propylene-derived units. In other embodiments, polymers comprising 8 to 20% by weight of ethylene-derived units and 92 to 80% by weight of propylene-derived units are preferred. In still other embodiments, polymers comprising 10 to 20% by weight of ethylene-derived units and 90 to 80% by weight of propylene-derived units.

In other embodiments, a propylene-rich alpha-olefin interpolymer that comprises a copolymer of propylene and at least one comonomer selected from the group consisting of ethylene and $C_4$ to $C_{20}$ alpha-olefins, wherein the copolymer has a propylene content of greater than 65 mole percent, a weight average molecular weight (Mw) of from about 15,000 to about 200,000, a weight average molecular weight/number average molecular weight ratio (Mw/Mn) of from about 1.5 to about 4.

Some thermoplastic resins or propylene-rich alpha-olefin interpolymers used in this aspect have a heat of fusion of less than about 80 J/g, preferably from about 8 to about 80, or more preferably from about 30 to about 80 J/g as determined by DSC.

In some embodiments, the propylene-rich alpha-olefin interpolymer has a crystallinity of less than about 50%. In other embodiments, the crystallinity ranges from about 5% to about 45%, or from about 5% to about 40%.

In still other embodiments, the propylene-rich interpolymer has a flexural modulus, measured in accordance with ASTM D-790-97, of less than about 50 kpsi, preferably less than about 40 kpsi, more preferably less than about 30 kpsi. In some dispersions, polymers having lower value for the flexural modulus are preferred. For example, some polymers have a flexural modulus of about 2 to about 15 kpsi, particularly about 4 to about 10 kpsi.

Propylene-rich interpolymers or thermoplastic resins with a melting point of less than about 140° C., preferably less than about 130° C., more preferably less than about 120° C. are used. In some preferred embodiments, the propylene-rich interpolymer or thermoplastic resin has a melting point of less than about 90° C.

Any suitable dispersing agent can be used in embodiments of this aspect of the invention. However, in particular embodiments, the dispersing agent comprises at least one carboxylic acid, a salt of at least one carboxylic acid, carboxylic acid ester or salt of a carboxylic acid ester. In some preferred embodiments, the carboxylic acid, the salt of the carboxylic acid, at least one carboxylic acid fragment of the carboxylic acid ester or its salt has fewer than 25 carbon atoms. In other embodiments, such moieties have 12 to 25 carbon atoms. In some embodiments, 15 to 25 carbon atoms are preferred. In other embodiments, the dispersing agent comprises at least one carboxylic acid, the salt of the at least one carboxylic acid, at least one carboxylic acid fragment of the carboxylic acid ester or its salt that has 25 to 60 carbon atoms. Some preferred salts comprises a cation selected from the group consisting of an alkali metal cation, alkaline earth metal cation, or ammonium or alkyl ammonium cation.

In still other embodiments, the dispersing agent is selected from the group consisting of ethylene acid polymers such as ethylene acrylic acid copolymers or ethylene methacrylic acid copolymers.

In other embodiments, the dispersing agent is selected from alkyl ether carboxylates, petroleum sulfonates sulfonated polyoxyethylenated alcohol, sulfated or phosphated polyoxyethylenated alcohols, polymeric ethylene oxide/propylene oxide/ethylene oxide dispersing agents, primary and secondary alcohol ethoxylates, alkyl glycosides and alkyl glycerides.

Combinations any of the above-enumerated dispersing agents can also be used to prepared some aqueous dispersions.

Some dispersions described herein have an advantageous particle size distribution. In particular embodiments, the dispersion has a particle size distribution defined as volume average particle diameter (Dv) divided by number average particle diameter (Dn) of less than or equal to about 2.0. In other embodiments, the dispersion has a particle size distribution of less than or equal to about less than 1.5.

Some dispersions described herein comprise particles having a volume average particle size of less than about 1.5 μm. In other embodiments, the average particle size ranges from about 0.05 μm to about 1.5 μm. In still other embodiments, the average particle size of the dispersion ranges from about 0.5 μm to about 1.5 μm.

For dispersions having a pH of less than 12, some dispersions have a pH of from about 5 to about 11.5, preferably from about 7 to about 11, more preferably from about 9 to about 11.

Preferably, the dispersions are characterized by a percent solids content of less than about 74% by volume. Some dispersions have a percent solids of from about 5% to about 74% by volume. Still other dispersions have a percent solids of less than about 70% by volume, less than about 65% by volume, or from about 5% to about 50% by volume.

In another aspect, embodiments of the invention provide a method for producing an aqueous dispersion comprising: (1) melt kneading (A) at least one at least one propylene-rich alpha-olefin interpolymer, (B) at least one dispersing agent, to form a melt-kneaded product; and (2) diluting said melt-kneaded product, and melt kneading the resulting mixture to form the aqueous dispersion. In particular embodiments, the method includes diluting the melt kneaded product to provide a dispersion having a pH of less than 12. Some methods provide a dispersion with an average particle size of less than about 5 μm. In still other embodiments, the method provides a dispersion that comprises less than 4 percent by weight of the dispersing agent based on the weight of the polymer. Embodiments of the methods use the thermoplastic resins and dispersing agents described above. And in some embodiments, the methods provide dispersions having on or more of the properties described above.

In still another aspect embodiments of the invention provide an aqueous dispersion comprising (A) at least one thermoplastic resin; (B) at least one dispersing agent; and (C) water; wherein the thermoplastic resin comprises a propylene-rich alpha-olefin interpolymer comprising 5 to 25% by weight of ethylene-derived units and 95 to 75% by weight of propylene-derived units, the copolymer having: (a) a melting point of less than 90° C.; (b) a relationship of elasticity to 500% tensile modulus such that the elasticity is less than or equal to $0.935M+12$, where elasticity is in percent and M is the 500% tensile modulus in MPa; and (c) a relationship of flexural modulus to 500% tensile modulus such that flexural modulus is less than or equal to $4.2e^{0.27M}+50$, where flexural modulus is in MPa and M is the 500% tensile modulus in MPa.

In another aspect of the invention, the some dispersion are suitable for making various articles. Some such articles include coatings, foams and froths as well as decorative articles.

DETAILED DESCRIPTION OF EMBODIMENTS OF THE INVENTION

Figure 1:
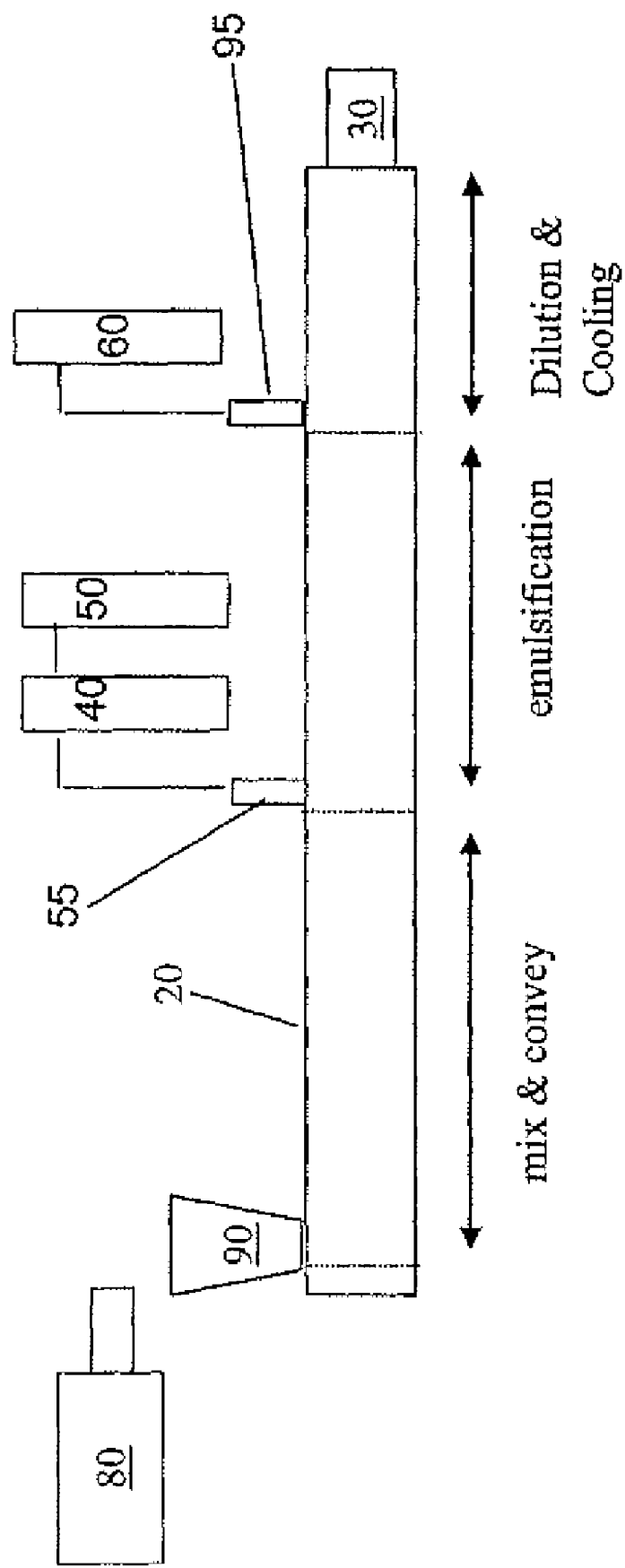
FIG. 1 is a schematic representation of a typical melt-extrusion apparatus used to prepare embodiments of the invention.

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R_L$ and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

The thermoplastic resin (A) included in embodiments of the aqueous dispersion of the present invention is a resin that is not readily dispersible in water by itself. In some embodiments it is present in the dispersion in an amount of from greater than 0 percent by wt. to less than about 96 percent by wt. In certain embodiments, the resin is present in an amount of from about 35 to about 65 percent by wt. of the dispersion. The term "resin" used herein should be construed to include synthetic polymers or chemically modified natural resins such as but not limited to thermoplastic materials such as polyvinyl chloride, polystyrene, and polyethylene and thermosetting materials such as polyesters, epoxies, and silicones that are used with fillers, stabilizers, pigments, and other components to form plastics. The term resin as used herein includes elastomers and is understood to include blends of olefin polymers. In some embodiments, the thermoplastic resin is a semicrystalline resin. The term "semi-crystalline" is intended to identify those resins that possess at least one endotherm when subjected to standard differential scanning calorimetry (DSC) evaluation. Some semi-crystalline polymers exhibit a DSC endotherm that exhibits a relatively gentle slope as the scanning temperature is increased past the final endotherm maximum. This reflects a polymer of broad melting range rather than a polymer having what is generally considered to be a sharp melting point. Some polymers useful in the dispersions of the invention have a single melting point while other polymers have more than one melting point. In some polymers one or more of the melting points may be sharp such that all or a portion of the polymer melts over a fairly narrow temperature range, such as a few degrees centigrade. In other embodiments, the polymer may exhibit broad melting characteristics over a range of about 20° C.

Examples of the thermoplastic resin (A) which may be used in the present invention include homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like. These resins may be used either alone or in combinations of two or more.

In particular embodiments, polyolefins such as polypropylene, polyethylene, and copolymers thereof and blends thereof, as well as ethylene-propylene-diene terpolymers. In some embodiments, preferred olefinic polymers include homogeneous polymers described in U.S. Pat. No. 3,645,992 by Elston; high density polyethylene (HDPE) as described in U.S. Pat. No. 4,076,698 to Anderson; heterogeneously branched linear low density polyethylene (LLDPE); heterogeneously branched ultra low linear density (ULDPE); homogeneously branched, linear ethylene/alpha-olefin copolymers; homogeneously branched, substantially linear ethylene/alpha-olefin polymers which can be prepared, for example, by a process disclosed in U.S. Pat. Nos. 5,272,236 and 5,278,272, the disclosure of which process is incorporated herein by reference; and high pressure, free radical polymerized ethylene polymers and copolymers such as low density polyethylene (LDPE), ethylene-acrylic acid (EAA) and Ethylene-methacrylic acid copolymers such as for example those available under the tradenames Primacor™, Nucrel™, and Escor™ and described in U.S. Pat. Nos. 4,599,392, 4,988,781, and 59384373, each of which is incorporated herein by reference in its entirety, and ethylene-vinyl acetate (EVA) copolymers. Polymer compositions described in U.S. Pat. Nos. 6,538,070, 6,566,446, 5,869,575, 6,448,341, 5,677,383, 6,316,549, 6,111,023, or 5,844,045, each of which is incorporated herein by reference in its entirety, are also suitable in some embodiments. Of course, blends of polymers can be used as well. In some embodiments the blends include two different Ziegler-Natta polymers. In other embodiments, the blends can include blends of a Ziegler-Natta and a metallocene polymer. In still other embodiments, the thermoplastic resin used herein is a blend of two different metallocene polymers.

In some particular embodiments, the thermoplastic resin is a propylene-based copolymer or interpolymer. In some embodiments the propylene/ethylene copolymer or interpolymer is characterized as having substantially isotactic propylene sequences The term "substantially isotactic propylene sequences" and similar terms mean that the sequences have an isotactic triad (mm) measured by 13C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}C$ NMR spectra. NMR spectra are determined as described below. Preferably, when the aqueous dispersions comprise a propylene/ethylene interpolymer, the ethylene is present in an amount of from about 5% to about 25% (by weight).

$^{13}C$ NMR spectroscopy is one of a number of techniques known in the art of measuring comonomer incorporation into a polymer and measuring isotactic triad levels in propylene-based copolymers. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated 1H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Preferably, the propylene/ethylene interpolymer has a crystallinity of less than about 50% and a flexural modulus, measured in accordance with ASTM D-790-97, of less than about 50 kpsi, preferably less than about 40 kpsi, and especially less than about 30 kpsi. Preferably, the propylene/ethylene interpolymer has a melting point of less than about 140° C., preferably less than about 130° C., more preferably less than about 120° C., especially less than about 90° C. The propylene/ethylene interpolymers used in the dispersions also preferably have a heat of fusion of less than 80 J/gm, more preferably less than about 75 J/gm, and can be as low as about 8 J/gm.

In some preferred dispersions, the propylene-based copolymer comprises a propylene-ethylene copolymer made using a nonmetallocene, metal-centered, heteroaryl ligand catalyst as described in U.S. patent application Ser. No. 10/139,786 filed May 5, 2002, which is incorporated by reference herein in its entirety for its teachings regarding such catalysts. The propylene-ethylene copolymers made with such nonmetallocene, metal-centered, heteroaryl ligand catalyst exhibit a unique regio-error. The regio-error is identified by $^{13}$C NMR peaks corresponding at about 14.6 and about 15.7 ppm, which are believed to be the result of stereoselective 2,1-insertion errors of propylene units into the growing polymer chain. In this particularly preferred aspect, these peaks are of about equal intensity, and they typically represent about 0.02 to about 7 mole percent of the propylene insertions into the homopolymer or copolymer chain.

In some aspects of the invention, the propylene-based copolymer has a molecular weight distribution (MWD), defined as weight average molecular weight divided by number average molecular weight (Mw/Mn) of about 4 or less, and can be as low as about 1.5.

Molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent propylene-ethylene copolymer molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N.Y. Hellman, P. M. Muglia, Macromolecules, 4, 507 (1971)) in the Mark-Houwink equation:

$$\{N\}=KMa$$

where Kpp=1.90E-04, app=0.725 and Kps=1.26E-04, aps=0.702.

In one embodiment of the invention, the thermoplastic resins utilized in the invention are characterized by a DSC curve with a Tme that remains essentially the same and a Tmax that decreases as the amount of unsaturated comonomer in the copolymer is increased. Tme means the temperature at which the melting ends and Tmax means the peak melting temperature, both as determined by one of ordinary skill in the art from DSC analysis using data from the final heating step. For such polymers, DSC analysis can be determined using a model Q1000 DSC from TA Instruments, Inc., which is calibrated using indium and deionized water.

In some other embodiments, thermoplastic polymer compositions disclosed in U.S. Pat. No. 6,525,157, incorporated by reference in its entirety. The polymers described therein comprise a majority of propylene with a minor amount of ethylene. These polymer compositions include a linear, single homogeneous macromolecular copolymer structure. These polymers have limited crystallinity due to adjacent isotactic propylene units and have a melting point as described below. They are generally devoid of any substantial intermolecular heterogeneity in tacticity and comonomer composition, and are substantially free of diene. They are also devoid of any substantial heterogeneity in intramolecular composition distribution.

In some embodiments of the dispersions described herein, the copolymer includes from a lower limit of 5% or 6% or 8% or 10% by weight ethylene-derived units to an upper limit of 20% or 25% by weight ethylene-derived units. These embodiments also will include propylene-derived units present in the copolymer in the range of from a lower limit of 75% or 80% by weight to an upper limit of 95% or 94% or 92% or 90% by weight. These percentages by weight are based on the total weight of the propylene and ethylene-derived units; i.e., based on the sum of weight percent propylene-derived units and weight percent ethylene-derived units being 100%.

Within these ranges, these copolymers are mildly crystalline as measured by differential scanning calorimetry (DSC), and are exceptionally soft, while still retaining substantial tensile strength and elasticity. Elasticity, as defined in detail hereinbelow, is a dimensional recovery from elongation for these copolymers. At ethylene compositions lower than the above limits for the copolymer, such polymers are generally crystalline, similar to crystalline isotactic polypropylene, and while having excellent tensile strength, they do not have the favorable softness and elasticity. At ethylene compositions higher than the above limits for the copolymer component, the copolymer is substantially amorphous. While such a material of higher ethylene composition may be soft, these compositions are weak in tensile strength and poor in elasticity. In summary, such copolymers of embodiments of our invention exhibit the softness, tensile strength and elasticity characteristic of vulcanized rubbers, without vulcanization.

Propylene and ethylene are the monomers that can be used to make the copolymers of embodiments of our invention, but optionally, ethylene can be replaced or added to in such polymers with a $C_4$ to $C_{20}$ alpha-olefin, such as, for example, 1-butene, 4-methyl-1-pentene, 1-hexene or 1-octene.

In some embodiments of the present invention the copolymers are substantially free of diene-derived units. Dienes are nonconjugated diolefins which may be incorporated in polymers to facilitate chemical crosslinking reactions. "Substantially free of diene" is defined to be less than 1% diene, or less than 0.5% diene, or less than 0.1% diene, or less than 0.05% diene, or equal to 0%. All of these percentages are by weight in the copolymer. The presence or absence of diene can be conventionally determined by infrared techniques well known to those skilled in the art.

Sources of diene include diene monomer added to the polymerization of ethylene and propylene, or use of diene in catalysts. No matter the source of such dienes, the above outlined limits on their inclusion in the copolymer are contemplated. Conjugated diene-containing metallocene catalysts have been suggested for the formation of copolymers of olefins. However, polymers made from such catalysts will incorporate the diene from the catalyst, consistent with the incorporation of other monomers in the polymerization.

In embodiments of our invention, a thermoplastic resin is included having a weight average molecular weight (Mw) of from 15,000-5,000,000, or from 20,000 to 1,000,000 and a molecular weight distribution Mw/Mn (sometimes referred to as a "polydispersity index" (PDI)) ranging from a lower limit of 1.01, 1.5 or 1.8 to an upper limit of 40 or 20 or 10 or 5 or 3.

In the measurement of properties ascribed to some propylene-rich polymers of some dispersions, there is a substantial absence of a secondary or tertiary polymer or polymers to form a blend. By "substantial absence" we intend less than 10%, or less than 5%, or less than 2.5%, or less than 1%, or 0%, by weight.

Another measure of molecular weight typically used for polyethylene polymers is the melt index of the polymer, also called $I_2$. The melt index is indirectly proportional to the molecular weight, although the relationship is not linear. For polyethylene the melt index is measured according to ASTM D-1238, condition 190 deg C./2.16 kg). Typical thermoplastic resins useful in embodiments of the invention have an $I_2$ in the range of from 0.001 to 1000 g/10 min. In some embodiments, the thermoplastic resin (A) has an $I_2$ of from 0.5 to 500 g/10 min. Other embodiments include a thermoplastic resin with an $I_2$ of from 1 to 300 g/10 min. The selection of suitable $I_2$ for the thermoplastic resin should be selected in view of the ease of melt kneadability and physical properties of the coating formed.

Melt flow rate (MFR) is another way of measuring the molecular weight of polypropylene polymers. Like melt index, MFR is indirectly proportional to the molecular weight, although the relationship is not linear. MFR is typically measured according to ASTM D-1238, condition 230° deg C./2.16 kg). Typical thermoplastic resins useful in embodiments of the invention have an MFR less than about 250 g/10 min. In some embodiments, the thermoplastic resin (A) has an MFR of from about 1 to about 200 g/10 min. Other embodiments include a thermoplastic resin with an MFR of from 5 to 100 g/10 min Melting Point and Crystallinity Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., Thermal Characterization of Polymeric Materials, Academic Press, 1981). For example, DSC analysis may be determined using a model Q1000 DSC from TA Instruments, Inc, which is calibrated using indium and deionized water. After heating the sample rapidly to 230 C and holding for 3 minutes, the cooling curve is obtained by cooling at 10 C/min to –40 C. After holding at –40 C for 3 minutes, the DSC melting endotherm is recorded while heating at 10 C/min. The melting point is determined using the standard TA DSC software.

These propylene-rich polymers can be made by a number of processes, such as by single stage, steady state, polymerization conducted in a well-mixed continuous feed polymerization reactor. In addition to solution polymerization, other polymerization procedures such as gas phase or slurry polymerization may be used. Other details suitable processes for preparing such polymers are described in U.S. Pat. No. 6,525, 157, incorporated by reference in its entirety.

A typical isotactic polymerization process consists of a polymerization in the presence of a catalyst including a bis (cyclopentadienyl) metal compound and either (1) a non-coordinating compatible anion activator, or (2) an alumoxane activator. According to one embodiment of the invention, this process comprises the steps of contacting ethylene and propylene with a catalyst in a suitable polymerization diluent, the catalyst including, in one embodiment, a chiral metallocene compound, e.g., a bis(cyclopentadienyl) metal compound as described in U.S. Pat. No. 5,198,401, and an activator. U.S. Pat. No. 5,391,629 also describes catalysts useful to produce the some copolymers suitable in dispersions described herein. Gas phase polymerization processes are described in U.S. Pat. Nos. 4,543,399, 4,588,790, 5,028,670, for example. Methods of supporting metallocene catalysts useful for making some copolymers used embodiments of the invention are described in U.S. Pat. Nos. 4,808,561, 4,897,455, 4,937,301, 4,937,217, 4,912,075, 5,008,228, 5,086,025, 5,147,949, and 5,238,892. Numerous examples of the biscyclopentadienyl metallocenes described above for the invention are disclosed in U.S. Pat. Nos. 5,324,800; 5,198,401; 5,278,119; 5,387, 568; 5,120,867; 5,017,714; 4,871,705; 4,542,199; 4,752,597; 5,132,262; 5,391,629; 5,243,001; 5,278,264; 5,296,434; and 5,304,614. Descriptions of ionic catalysts for coordination polymerization including metallocene cations activated by non-coordinating anions appear in the early work in EP-A-0 277 003, EP-A-0 277 004, U.S. Pat. Nos. 5,198,401 and 5,278,119, and WO 92/00333. The use of ionizing ionic compounds not containing an active proton but capable of producing both the active metallocene cation and a non-coordinating anion is also known. See, EP-A-0 426 637, EP-A-0 573 403 and U.S. Pat. No. 5,387,568, EP-A-0 427 697 and EP-A-0 520 732. Ionic catalysts for addition polymerization can also be prepared by oxidation of the metal centers of transition metal compounds by anionic precursors containing metallic oxidizing groups along with the anion groups; see EP-A-0 495 375.

Some polymers can be prepared by a polymerization process comprising: reacting propylene and at least one comonomer selected from the group consisting of ethylene and at least one $C_4$ to $C_{20}$ alpha-olefin, under polymerization conditions in the presence of a metallocene catalyst capable of incorporating the propylene sequences into isotactic or syndiotactic orientations, in at least one reactor to produce a first copolymer having at least 65 mole % propylene and wherein preferably at least 40% of the propylene sequences are in isotactic or syndiotactic orientations; wherein the copolymer has a melt index (MI) from about 7 dg/min to about 3000 dg/min. Some details of the polymers are described in the following paragraphs.

Preferably, the propylene-rich polymer or polymer blend has a melting point of from 60 to 120° C., more preferably from 80 to 100° C. Also, the polymer or polymer blend preferably includes ethylene (or an alpha olefin, e.g., having from 4-20 carbon atoms) in the amount of up to 30 mole %, preferably from 3 mole % to 20 mole % and more preferably from 7 mole % to 15 mole wt %. In this context, the ethylene or alpha olefin can be units forming part of a random semicrystalline copolymer that includes both propylene units and ethylene units, e.g., when a single copolymer is used (not a blend). Alternatively, a blend can be used in which isotactic polypropylene is blended with a polyethylene, in which case the ethylene units in the polyethylene should be up to 30 mole % of the overall polymer blend. As discussed in greater detail below, it is contemplated that while the presence of ethylene units may provide the desired melting point, those same ethylene units may cause crosslinking to such an extent that the MFR is decreased rather than increased, and for that reason, the amount of ethylene should be limited.

In other specific embodiments, the dispersions include a propylene-rich polymer or polymer blends wherein the composition preferably includes a random copolymer produced by copolymerizing propylene and at least one of ethylene or alpha-olefin having 20 or less carbon atoms, preferably 8 or less carbon atoms, the random copolymer having a crystallinity at least about 2% and no greater than about 65% derived from stereoregular polypropylene sequences and a melting point of from about 25° C. to about 105° C.

In still other specific embodiments, the propylene-rich copolymers are the reaction product of a free radical initiator and a random copolymer produced by copolymerizing propylene and at least one of ethylene or alpha-olefin having 8 or less carbon atoms, the random copolymer having a crystallinity at least about 2% and no greater than about 65% derived from stereoregular polypropylene sequences and a melting point of from about 25° C. to about 105° C.

In yet another specific embodiment of this invention the dispersion includes a random polymer with a melting point between about 60° C. and 140° C., more preferably between 80° C. and 110° C. The viscosity as measured by melt flow rate at 230° C. should be between 2 and 5600, more preferably between 70 and 370, and most preferably between 300 and 1800. Correspondingly, the melt index, measured at 190° C., should be between 20 and 1500, more preferably between 40 and 1000, and most preferably between 100 and 500. Further, the tensile elongation of the polymer at room temperature should be in excess of 50%, more preferably in excess of 100%, and most preferably in excess of 300%. Preferably, the random copolymer is a low molecular weight copolymer containing propylene units in an amount of 80% or above, preferably more than 90%, with the propylene units preferably being predominantly isotactic sequences (more than 80% of the units being isotactic pentads), as measured by $^{13}C$ NMR. The random copolymers can have long chain branching, providing greater flexibility for desired rheological properties.

Still other dispersions can include a polyolefin composition containing a physical blend, wherein an ethylene-propylene copolymer is blended together with isotactic polypropylene. Those ethylene-propylene copolymers are preferably derived by solution polymerization using chiral metallocene catalysts. Those ethylene-propylene copolymers preferably have crystallinity derived from isotactic propylene sequences. In those blend compositions, the composition of the copolymers includes up to 30 wt % and preferably up to 20 wt % ethylene. Those copolymers may be linear or branched. Those blends preferably contain substantial amounts of isotactic polypropylene, at least about 5 to 10 wt %. In a specific embodiment, the blend can include isotactic polypropylene in an amount up to about 50 wt %, or alternatively up to about 80 wt %. The blend can also include other olefin-based polymers, such as reactor copolymers and impact copolymers. Desirably, the use of the blends described above provide for favorable melting temperatures due to the presence of the isotactic polypropylene while providing a separate molecular architecture for the copolymer, thus improving the rheology, elasticity and flexibility of the adhesive composition.

In still other embodiments, some dispersions include a thermoplastic resin selected from copolymers and interpolymers of ethylene and/or propylene and other monomers selected from $C_4$ to $C_{10}$ olefins, preferably alpha-olefins, more preferably from $C_4$ to $C_8$ alpha-olefins and most preferably selected from n-butene, n-hexene and n-octene. The ethylene or propylene content of the thermoplastic resin ranges from about 2-98 wt. percent of the resin.

In some embodiments, a primarily ethylene-based polyolefin is selected in which ethylene comprises from about 98 to 65 percent of polymer. In other embodiments, a primarily propylene-based polyolefin may be selected, propylene comprising from about 98 to 65 percent of the Polymer. Selected comonomer(s) make up the remainder of the polymer.

In some such embodiments, the ethylene polymer has the following characteristics and properties: 1) Crystallinity as determined by the observance of at least one endotherm when subjected to standard differential scanning calorimetry (DSC) evaluation; 2) a melt index of between about 30 and about 0.1 g/10 min, preferably of between 25 and 0.25 g/10 min, more preferably of between 22 and 0.5 g/10 min and most preferably of between 18 and 0.75 g/10 min; and 3) a density as determined according to ASTM D-792 of between about 0.845 and about 0.925 g/cc, preferably between 0.85 10 and 0.91 g/cc, and more preferably between 0.855 and 0.905 g/cc, and most preferably between 0.86 and 0.90 g/cc.

One class of resins particularly suited to use in embodiments of the invention are copolymers of ethylene and 1-octene or 1-butene, where ethylene comprises from about 90 to about 50, more preferably 85 to 55, and 1-octene or 1-butene from about 10 to about 50, more preferably about 15 to 45 percent by weight of the copolymer, and that have Melt Index of between about 0.25 and about 30, more preferably between 0.5 and 20 g/10 min. Alternatively, instead of a single Polymer a blend of polymers may be employed that has the physical characteristics described above. For example, it may be desirable to blend a first polymer with relatively high MI that is outside the range described above, with another of relatively low MI, so that the combined MI and the averaged density of the blend fall within the ranges noted above.

In addition to the thermoplastic resin, dispersions described herein include a dispersing agent. Any dispersing agent may be used in embodiments of the invention. As used herein the term "dispersing agent" means an agent that aids in the formation and/or the stabilization of an dispersion. Some dispersing agents can also be used to form emulsions and are described in detail by Paul Becher (Emulsions: Theory and Practice, 3rd edition, Oxford University Press, New York, 2001), incorporated herein by reference in its entirety. Dispersing agents generally fall into three classes 1) surface-active materials, 2) naturally occurring materials, 3) finely divided solids. Surface-active agents, also called surfactants, are materials that reduce the interfacial tension between two immiscible liquid phases. They are classified according to the hydrophilic group in the molecule: anionic, cationic, non-ionic, or ampholytic (amphoteric). Examples of commercially available dispersing agents is found in McCutcheon (McCutcheon's Emulsifiers and Detergents, Glen Rock, N.J., issued annually). Examples of naturally occurring materials include phospholipids, sterols, lanolin, water-soluble gums, alginates, carageenin, and cellulose derivatives. Examples of finely divided solids include basic salts of the metals, carbon black, powdered silica, and various clay (principally bentonite).

In some embodiments, a carboxylic acid or carboxylic acid salt is used as the dispersing agent. Typical salts include an alkali metal salt or an alkaline earth metal salts of the fatty acid. Other salts include ammonium or alkyl ammonium salts of the carboxylic acid. In some embodiments, the carboxylic acid or it's salt with 12 to fewer than 25 carbon atoms. Where the dispersing agent is a salt, the number of carbons refers to the carbon atoms associated with the carboxylic acid fragment. In other embodiments, the salt is formed with a fatty acid fragment that has at from 15 to 25 carbon atoms. Particular embodiments use an alkali metal salt of erucic acid. Erucic acid is a carboxylic acid with 22 carbon atoms. Some embodiments use erucic acid in the form of rapeseed oil which is a natural oil that contains approximately 40 to about 50% erucic acid with the remainder consisting of primarily chains having 18 carbon atoms. An alkali metal salt of erucic acid is also useful in some embodiments.

Some embodiments of the present invention use a fatty acid or its salt that is derived from an ester of a fatty acid. The alcohol residue constituting such ester may preferably contain 2 to 30 carbon atoms, and most preferably 6 to 20 carbon atoms. Such residue may be either a straight or a branched residue, and may also be a mixture of two or more residues each containing different number of carbon atoms. Exemplary such alcohol residues include residues of higher alcohols containing 10 to 20 carbon atoms such as cetyl alcohol, stearyl alcohol, and oleyl alcohol. Some embodiments use an ester wax of erucic acid.

In particular embodiments the salt of a fatty acid containing fewer than 25 carbon atoms is produced by neutralizing a fatty acid containing fewer than 25 carbon atoms or by saponification of an ester of a fatty acid containing fewer than 25 carbon atoms.

In other embodiments, the dispersing agent can be an ethlyene acrylic acid copolymer. Still other embodiments use alkyl ether carboxylates as the dispersing agent. In some embodiments, petroleum sulfonates are useful. In other embodiments, the dispersing agent is a sulfonated or polyoxyethylenated alcohol. In still other embodiments, sulfated or phosphated polyoxyethylenated alcohols are suitable. Polymeric ethylene oxide/propylene oxide/ethylene oxide dispersing agents, known as poloxamers are used as the dispersing agent. Primary and secondary alcohol ethoxylates are also suitable in some dispersions. Alkyl glycosides and alkyl glycerides are used in some dispersions. Of course, combinations of these dispersing agents are also suitable.

Embodiments of the aqueous dispersions described herein contain water in addition to the components as described above. Deionized water is typically preferred. In some embodiments, water with excess hardness can undesirably affect the formation of a suitable dispersion. Particularly water containing high levels of alkaline earth ions, such as $Ca^{2+}$, should be avoided. The term "dispersion" as used herein refers to a finely divided solid or liquid in a continuous liquid medium. An aqueous dispersion is a dispersion in which the continuous liquid medium is water. The term "dispersion" as used herein in connection with the compositions of the invention is intended to include within its scope both emulsions of essentially liquid materials, prepared employing the thermoplastic resin and the dispersing agent, and dispersions of solid particles. Such solid dispersions can be obtained, for example, by preparing an emulsion as previously described, and then causing the emulsion particle to solidify by various means. Thus, when the components are combined, some embodiments provide an aqueous dispersion wherein content of the dispersing agent is present in the range of from 0.5 to 30 parts by weight, and content of (C) water is in the range of 1 to 35% by weight per 100 parts by weight of the thermoplastic polymer; and total content of (A) and (B) is in the range of from 65 to 99% by weight. In particular embodiments, the dispersing agent ranges from 2 to 20 parts by weight based on 100 parts by weight of the polymer. In some embodiments, the amount of dispersing agent is less than about 4 percent by wt., based on the weight of the thermoplastic polymer. In some embodiments, the dispersing agent comprises from about 0.5 percent by wt. to about 3 percent by weight, based on the amount of the thermoplastic polymer used. In other embodiments, about 1.0 to about 3.0 weight percent of the dispersing agent are used. Embodiments having less than about 4 weight percent dispersing agent are preferred where the dispersing agent is a carboxylic acid.

One feature of some embodiments of the invention is that the dispersions have a small particle size. Typically the average particle size is less than about 5 µm. Some preferred dispersions have an average particle size of less than about 1.5 µm. In some embodiments, the upper limit on the average particle size is about 4.5 µm, 4.0 µm, 3.5 µm, 3.75 µm, 3.5 µm, 3.0 µm, 2.5 µm, 2.0 µm, 1.5 µm, 1.0 µm, 0.5 µm, or 0.1 µm. Some embodiments have a lower limit on the average particle size of about 0.05, 0.7 µm, 0.1 µm, 0.5 µm, 1.0 µm, 1.5 µm, 2.0 µm, or 2.5 µm. Thus, some particular embodiments have, for example, an average particle size of from about 0.05 µm to about 1.5 µm. While in other embodiments, the particles in the dispersion have an average particle size of from about 0.5 µm to about 1.5 µm. For particles that are not spherical the diameter of the particle is the average of the long and short axes of the particle. Particle sizes can be measured on a Coulter LS230 light-scattering particle size analyzer or other suitable device.

Another parameter that characterizes particles in the dispersions is the particle size distribution, defined herein as the volume average particle diameter (Dv) divided by number average particle diameter (Dn). Some embodiments are characterized by a particle size distribution of less than or equal to about 2.0. In other embodiments, the dispersions have a particle size distribution of less than or equal to about less than 1.9, 1.7, or 1.5.

In yet another particular embodiment the aqueous dispersion has a concentration of the solid content including (A) thermoplastic resin is in the range of from 10 to 70%. Another measure of solids content is by volume. In some embodiments, the dispersion has a percent solids of less than about 74% by volume. Other dispersions have a solids content of from about 5% to about 74% by volume. In some embodiments, the dispersions have a percent solids of less than about 70% by volume, less than about 65% by volume, or ranging from about 5% to about 50% by volume.

One feature of some of the dispersions described herein is the pH, which can affect the uses for which dispersions are suitable. Typically, the dispersions have a pH of less than 12. Preferably, the pH ranges from about 5 to about 11.5, preferably from about 7 to about 11., more preferably from about 9 to about 11. However, dispersions having a lower limit of the pH of about 5, about 6, about 7, about 8, about 9, about 10, or about 11 are contemplated. Dispersions having an upper limit on the pH of about 6, about 7, about 8, about 9, about 10, about 11, or about 12 are contemplated.

While any method may be used, one convenience way to prepare the dispersions described herein is by melt-kneading. Any melt kneading means known in the art may be used. In some embodiments a kneader, a Banbury mixer, single-screw extruder, or a multi-screw extruder is used. The melt kneading may be conducted under the conditions which are typically used for melt kneading the thermoplastic resin (A). A process for producing the dispersions in accordance with the present invention is not particularly limited. One preferred process, for example, is a process comprises melt-kneading the abovementioned components according to U.S. Pat. No. 5,756,659 and U.S. Patent Application No. 20010011118. A preferred melt-kneading machine is, for example, a multi screw extruder having two or more screws, to which a kneading block can be added at any position of the screws. If desired, it is allowable that the extruder is provided with a first material-supplying inlet and a second material-supplying inlet, and further third and forth material-supplying inlets in this order from the upper stream to the down stream along the flow direction of a material to be kneaded. Further, if desired, a vacuum vent may be added at an optional position of the extruder. In some embodiments, the dispersion is first diluted to contain about 1 to about 3% by weight of water and then subsequently further diluted to comprise greater than 25% by weight of water. In some embodiments, the further dilution provides a dispersion with at least about 30% by weight of water. The aqueous dispersion obtained by the melt kneading may be further supplemented with an aqueous dispersion of an ethylene-vinyl compound copolymer, or a dispersing agent.

FIG. 1 schematically illustrates such an extrusion apparatus embodiments of the invention. An extruder, in certain embodiments a twin screw extruder, 20 is coupled to a back pressure regulator, melt pump, or gear pump, 30. Embodiments also provide a base reservoir, 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments the base and initial water are preheated in a preheater.

Resin in the form of pellets, powder or flakes is fed from the feeder 80 to an inlet 90 of the extruder 20 where the resin is melted or compounded. In some embodiments, the dispersing agent is added to the resin through an along with the resin and in other embodiments, the dispersing agent is provided separately to the twin screw extruder 20. The resin melt is then delivered to from the mix and convey zone to an emulsification zone of the extruder where the initial amount of water and base from the reservoirs 40 and 50 is added through inlet 55. In some embodiments, dispersing agent may be added additionally or exclusively to the water stream. In some embodiments, the emulsified mixture is further diluted with additional water inlet 95 from reservoir 60 in a dilution and cooling zone of the extruder 20. Typically, the dispersion is diluted to at least 30 weight percent water in the cooling zone. In addition, the diluted mixture may be diluted any number of times until the desired dilution level is achieved. In some embodiments, water is not added into the twin screw extruder 20 but rather to a stream containing the resin melt after the melt has exited from the extruder. In this manner, steam pressure build-up in the extruder 20 is eliminated.

In some embodiments a basic substance or aqueous solution, dispersion or slurry thereof is added to the dispersion at any point of the process, preferably to the extruder. Typically the basic substance is added as an aqueous solution. But in some embodiments, it is added in other convenient forms, such as pellets or granules. In some embodiments, the basic substance and water are added through separate inlets of the extruder. Examples of the basic substance which may be used for the neutralization or the saponification in the melt kneading process include alkaline metals and alkaline earth metals such as sodium, potassium, calcium, strontium, barium; inorganic amines such as hydroxylamine or hydrazine; organic amines such as methylamine, ethylamine, ethanolamine, cyclohexylamine, tetramethylammonium hydroxide; oxide, hydroxide, and hydride of alkaline metals and alkaline earth metals such as sodium oxide, sodium peroxide, potassium oxide, potassium peroxide, calcium oxide, strontium oxide, barium oxide, sodium hydroxide, potassium hydroxide, calcium hydroxide, strontium hydride, barium hydroxide, sodium hydride, potassium hydride, calcium hydride; and weak acid salts of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate; or ammonium hydroxide. In particular embodiments, the basic substance is a hydroxide of an alkaline metal or a hydroxide of an alkali metal. In some embodiments, the basic substance is selected from potassium hydroxide, sodium hydroxide and combinations thereof.

The aqueous dispersion may be coated onto a substrate by various procedures, and for example, by spray coating, curtain flow coating, coating with a roll coater or a gravure coater, brush coating, dipping. The coating is preferably dried by heating the coated substrate to 50 to 150° C. for 1 to 300 seconds although the drying may be accomplished by any suitable means.

The substrate for coatings may comprise a film of a thermoplastic resin such as polyethylene terephthalate, polyethylene, polycarbonate, polyimide, polyamide, polyphenylene sulfide, polysulfone, aromatic polyester, polyether ether ketone, polyether sulfone, and polyether imide. The preferred is the film comprising polyethylene terephthalate, polyethylene, polyamide, and polycarbonate, and the most preferred is the film comprising polyethylene terephthalate. Typically the films have a thickness in the range of from 0.5 to 50 microns, although some have a thickness of from 1 to 30 microns.

Some embodiments of the dispersions described herein are capable of forming a coating which exhibits excellent water resistance, oil resistance, or chemical resistance. Some embodiments exhibit adhesion to non-polar materials, and therefore, when the aqueous dispersion of the present invention is coated and dried on the surface of a substrate such as paper, fiber, wood, metal, or plastic molded article, the resulting resin coating will provide the substrate with water resistance, oil resistance, chemical resistance, corrosion resistance and heat sealability. Coatings obtained from some dispersions described herein exhibit excellent moisture resistance, water repellency, thermal adhesion to paper, especially for water and/or grease barrier and ink adhesion coatings layers, metal, glass, wood, fiber (natural fiber and synthetic fiber), and nonwoven fabric, thermal transfer properties, abrasion resistance, impact resistance, weatherability, solvent resistance, flexibility, and adaptability to high-frequency fabricating. Some dispersions are particularly suited for the formation of textile coatings including fabric impregnation. Some dispersions are also suitable for use as carpet backing layers. Coatings for architectural works are also contemplated as well as coatings for controlled release coatings on fertilizer pellets or as coatings to control surface properties such as coefficient of friction. Additionally some dispersions can be used to prepare stable froths and foams, as described in "Froths and Durable Foams of Dispersed Olefin Polymers and articles Prepared from Same" filed concurrently herewith.

Some aqueous dispersions described herein are used as a binder in a coating composition for a coated wall paper; a fiber coating agent (for improving the strength, moisture adsorption, or water repellency of the fiber); a net for construction, a sizing agent for nylon, polyester or glass fibers; a sizing agent/thermal adhesive of a paper or a nonwoven fabric; and an agent for imparting heat sealability with a paper or a film; a thermal adhesive of a sterilized paper; a binder of an ink or a coating composition; a surface coating agent for a paper or a film adapted for use with an ink jet printer; an agent for improving chipping resistance of an automotive coating composition; and the like.

In some embodiments, the aqueous dispersions have additional components in an amount that does not adversely affect the object of the present invention. Exemplary such additional components include water-soluble amino resins such as water-soluble melamine resin and water-soluble benzoguanamine resin and water-soluble epoxy resins for improving coating performance; organic thickeners such as polyvinyl alcohol, polyvinyl pyrrolidone, polyvinyl methylether, polyethylene oxide, polyacrylamide, polyacrylic acid, carboxy methyl cellulose, methyl cellulose, and hydroxyethyl cellulose and inorganic thickeners such as silicon dioxide, active clay, and bentonite for improving the stability and adjusting the viscosity of the dispersion; dispersing agents such as nonionic dispersing agents and anionic dispersing agents and water-soluble polyvalent metal salts for improving the stability of the dispersion; other additives such as anti-rust agent, anti-mold agent, UV absorber, thermal stabilizer, foaming agent, antifoaming agent, and the like; pigments such as titanium white, red iron oxide, phthalocyanine, carbon black, permanent yellow; and fillers such as calcium carbonate, magnesium carbonate, barium carbonate, talk, aluminum hydroxide, calcium sulfate, kaolin, mica, asbestos, mica, and calcium silicate.

EXAMPLES

Preparation Example 1

100 parts by weight of a thermoplastic ethylene-vinyl acetate commercially available from DuPont having a vinyl acetate content of about 28 wt %, a density of about 0.95 g/cm3 (ASTM D-792) and a melt index of about 6 g/10 min. (as determined according to ASTM D1238 at 190° C. and 2.16 kg), and a melting point of about 73° C. (as determined according to ASTM D3417.) and 4.2 parts by weight of a $C_{32}$ carboxylic acid (Unicid 425 manufactured by Baker-Petrolite, acid value 97 mg KOH/g) are melt kneaded at 180° C. in twin screw extruder at a rate of 8.3 kg/hr.

Upon the melt kneaded resin/surfactant, 4.6 wt % aqueous solution of potassium hydroxide is continuously fed into a downstream injection port at a rate 0.9 kg/hr (at a rate of 10 wt % of the total mixture). This aqueous dispersion is subsequently diluted with additional water at a rate of 5.7 kg/hr before exiting the extruder. An aqueous dispersion having a solids content of 56 wt % at pH 10.7 is obtained. The dispersed polymer phase measured by a Coulter LS230 particle analyzer consisted of an average volume diameter of 0.56 micron and a particle size distribution (dv/dn) of 1.45.

Preparation Example 2

100 parts by weight of a thermoplastic ethylene/1-octene copolymer with an octene content of about 38 wt %, a density of about 0.87 g/cm3 (ASTM D-792) and a melt index of about 5 g/10 min. (as determined according to ASTM D1238 at 190° C. and 2.16 kg) a Mw/Mn of about 2.0, and a melting point of about 63° C. (as determined by DSC at a scanning rate of about 10° C. per minute), commercially available from DuPont Dow Elastomers, and 3.1 parts by weight of a C18/C16 carboxylic acid (Industrene 106 manufactured by CK Witco, acid value 200 mg KOH/g) are melt kneaded at 125° C. in twin screw extruder at a rate of 7.9 kg/hr.

Upon the melt kneaded resin/surfactant, 23.9 wt % aqueous solution of potassium hydroxide is continuously fed into a downstream injection port at a rate 0.2 kg/hr (at a rate of 2.5 wt % of the total mixture). This aqueous dispersion is subsequently diluted with additional water at a rate of 5.4 kg/hr before exiting the extruder. To further dilute the resulting dispersion, additional water is added at a rate of 0.7 kg/hr after the mixture exited the extruder. An aqueous dispersion having a solids content of 56 wt % at pH 9.6 is obtained. The dispersed polymer phase measured by a Coulter LS230 particle analyzer consisted of an average volume diameter of 2.04 micron and a particle size distribution (dv/dn) of 1.18.

Preparation Example 3

100 parts by weight of a thermoplastic ethylene/1-octene copolymer with octene content of about 38 wt %, a density of about 0.87 g/cm3 (ASTM D-792) and a melt index of about 5 g/10 min. (as determined according to ASTM D1238 at 190° C. and 2.16 kg) a Mw/Mn of about 2.0, and a melting point of about 63° C. (as determined by DSC at a scanning rate of about 10° C. per minute.), commercially available from DuPont Dow Elastomers, and 3.6 parts by weight of a C22/C18 carboxylic acid (High-erucic rapeseed oil manufactured by Montana Specialty Mills, acid value 97 mg KOH/g) are melt kneaded at 150° C. in twin screw extruder at a rate of 5.0 kg/hr.

Upon the melt kneaded resin/surfactant, 16.3 wt % aqueous solution of potassium hydroxide is continuously fed into a downstream injection port at a rate 0.1 kg/hr (at a rate of 2.0 wt % of the total mixture). This aqueous dispersion is subsequently diluted with additional water at a rate of 3.2 kg/hr before exiting the extruder. To further dilute the resulting dispersion, additional water is added at a rate of 0.8 kg/hr after the mixture exited the extruder. An aqueous dispersion having a solids content of 55 wt % at pH 10.7 is obtained. The dispersed polymer phase measured by a Coulter LS230 particle analyzer consisted of an average volume diameter of 1.11 micron and a particle size distribution (dv/dn) of 1.85.

Preparation Example 4

100 parts by weight of a thermoplastic ethylene/1-octene copolymer with octene content of about 38 wt %, a density of about 0.87 g/cm3 (ASTM D-792) and a melt index of about 5 g/10 min. (as determined according to ASTM D1238 at 190° C. and 2.16 kg) a Mw/Mn of about 2.0, and a melting point of about 63° C. (as determined by DSC at a scanning rate of about 10° C. per minute.), commercially available from DuPont Dow Elastomers and 3.1 parts by weight of a C26 carboxylic acid (Unicid 350 manufactured by Baker-Petrolite, acid value 115 mg KOH/g) are melt kneaded at 150° C. in twin screw extruder at a rate of 9.7 kg/hr.

Upon the melt kneaded resin/surfactant, 12.5 wt % aqueous solution of potassium hydroxide is continuously fed into a downstream injection port at a rate 0.2 kg/hr (at a rate of 2.0 wt % of the total mixture). This aqueous dispersion is subsequently diluted with additional water at a rate of 7.5 kg/hr before exiting the extruder. An aqueous dispersion having a solids content of 56 wt % at pH 10.8 is obtained. The dispersed polymer phase measured by a Coulter LS230 particle analyzer consisted of an average volume diameter of 0.79 micron and a particle size distribution (dv/dn) of 1.95.

Preparation Example 5

100 parts by weight of a thermoplastic propylene-ethylene copolymer with an ethylene content of about 12.7 wt %, a density of about 0.864 g/cm3 (ASTM D-792) and a melt flow rate of about 23 g/10 min. (as determined according to ASTM D1238 at 230° C. and 2.16 kg), a melting point of 60-70° C., a Mw/Mn of about 2.0, and a flexural modulus of about 4 kpsi and commercially available from Dow Chemical, and 6.4 parts by weight of a $C_{26}$ carboxylic acid (Unicid 350 manufactured by Baker-Petrolite, acid value 115 mg KOH/g) are melt kneaded at 150° C. in twin screw extruder at a rate of 1.6 kg/hr.

Upon the melt kneaded resin/surfactant, 25 wt. % aqueous solution of potassium hydroxide is continuously fed into a downstream injection port at a rate 0.08 kg/hr (at a rate of 4.8 wt % of the total mixture). This aqueous dispersion is subsequently diluted with additional water at a rate of 1.5 kg/hr before exiting the extruder. An aqueous dispersion having a solids content of 51 wt % at pH 11.6 is obtained. The dispersed polymer phase measured by a Coulter LS230 particle analyzer consisted of an average volume diameter of 0.61 micron and a particle size distribution (dv/dn) of 1.31.

Preparation Example 6

100 parts by weight of a thermoplastic propylene-ethylene copolymer with comonomer content of about 9 wt %, a melting point of 86° C., a melt flow rate of about 25 g/10 min. (as determined according to ASTM D1238 at 230° C. and 2.16 kg), and a Mw/Mn of about 2.0, commercially available from Dow Chemical, and 42.9 parts by weight of an ethylene acrylic acid copolymer, available from the Dow Chemical Company under the tradename Primacor™ 5980i, with a melt index of about 15 g/10 min determined according to ASTM D1238 at 125° C./2.16 kg (which is equivalent to about 300 g/10 min when determined according to ASTM D1238 at 190° C./2.16 kg), an acrylic acid content of about 20.5 wt. %, and a DSC melting point of about 77° C. are melt kneaded at 170° C. in twin screw extruder at a rate of 4.3 kg/hr.

Upon the melt kneaded resin/surfactant, 11.7 wt. % aqueous solution of potassium hydroxide is continuously fed into a downstream injection port at a rate 1.6 kg/hr (at a rate of 27.1 wt % of the total mixture). This aqueous dispersion is subsequently diluted with additional water at a rate of 2.7 kg/hr before exiting the extruder. To further dilute the resulting dispersion, additional water is added at a rate of 2.3 kg/hr after the mixture exited the extruder. An aqueous dispersion having a solids content of 41 wt % at pH 9.9 is obtained. The dispersed polymer phase measured by a Coulter LS230 particle analyzer consisted of an average volume diameter of 0.86 micron and a particle size distribution (dv/dn) of 1.48.

As demonstrated above, embodiments of the invention provide new dispersions useful for many applications. In some instances, the new have one or more of the following advantages. First, some new dispersions have better durability. Certain dispersions exhibit improved adhesion properties and others may have improved adhesion as well as good toughness and durability. Other dispersions are easier to process in a melt-extrusion process. In particular, some dispersions are easier to process due to the low melting point of the polymers used therein. Some dispersions have the feature of being low yellowing. Other characteristics and additional advantages are apparent to those skilled in the art.

While the invention has been described with respect to a limited number of embodiments, the specific features of one embodiment should not be attributed to other embodiments of the invention. No single embodiment is representative of all aspects of the inventions. Moreover, variations and modifications therefrom exist. For example, the dispersions described herein may comprise other components. Various additives may also be used to further enhance one or more properties. In some embodiments, the dispersions are substantially free of any additive not specifically enumerated herein. Some embodiments of the dispersions described herein consist of or consist essentially of the enumerated components. In addition, some embodiments of the methods described herein consist of or consist essentially of the enumerated steps. The appended claims intend to cover all such variations and modifications as falling within the scope of the invention.

What is claimed is:

1. An ink binder composition comprising:
    an aqueous dispersion comprising:
        the melt blending product of: (A) at least one interpolymer of ethylene with at least one comonomer selected from the group consisting of a $C_4$-$C_{20}$ linear, branched or cyclic diene, and a compound represented by the formula $H_2C=CHR$ wherein R is a $C_1$-$C_{20}$ linear, branched or cyclic alkyl group or a $C_6$-$C_{20}$ aryl group, and; (B) at least one polymeric dispersing agent; (C) in the presence of water; and (D) optionally at least one neutralizing agent; wherein the dispersion has a pH in the range of from 8 to 11, and a volume average particle size of less than 5 µm.

2. The ink binder composition of claim 1, wherein the polymeric dispersing agent comprises less than 4 percent by weight based on the weight of the thermoplastic resin.

3. The ink binder composition of claim 1, wherein the interpolymer of ethylene has a density of less than 0.92 g/cc.

4. The ink binder composition of claim 1, wherein the dispersion has a particle size distribution defined as volume average particle diameter (Dv) divided by number average particle diameter (Dn) of less than or equal to about 2.0.

* * * * *